July 22, 1958     H. KUMMERMAN     2,844,118
WATER TIGHT HATCH COVER ARRANGEMENT
Filed Dec. 5, 1955     3 Sheets-Sheet 1
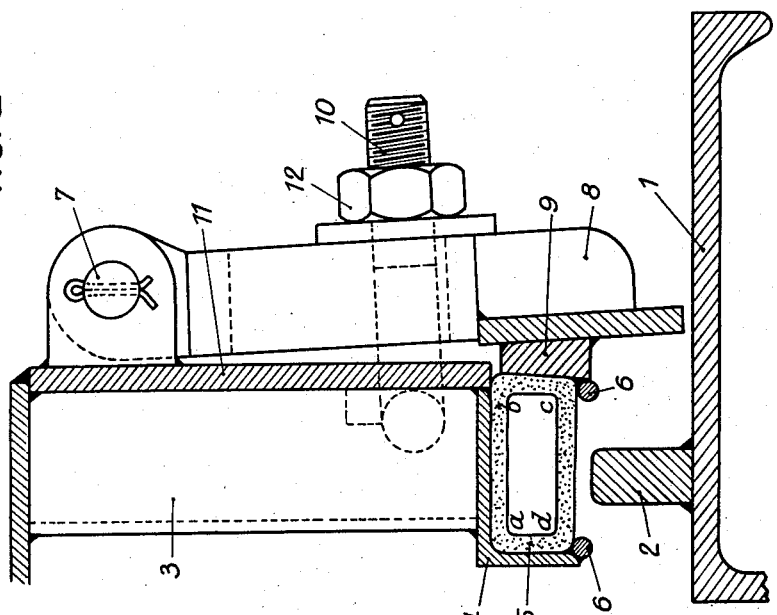
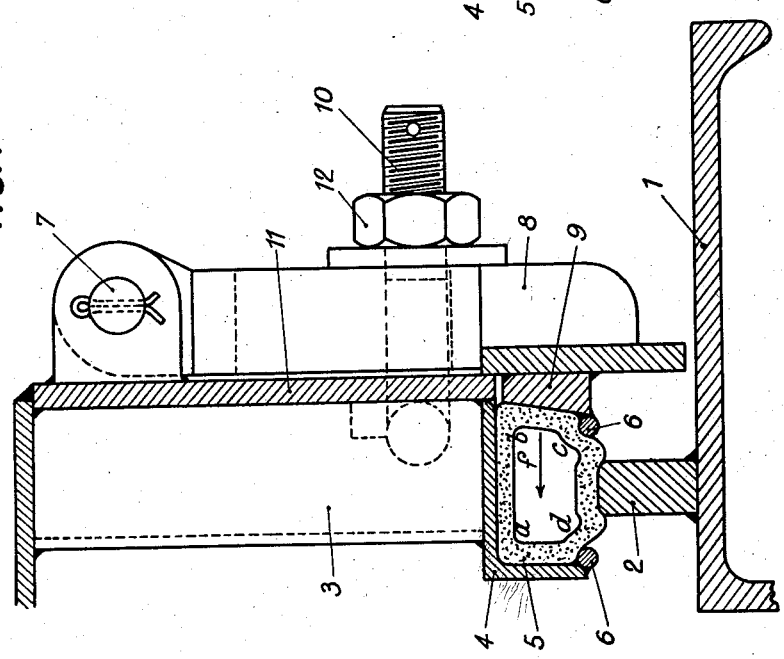

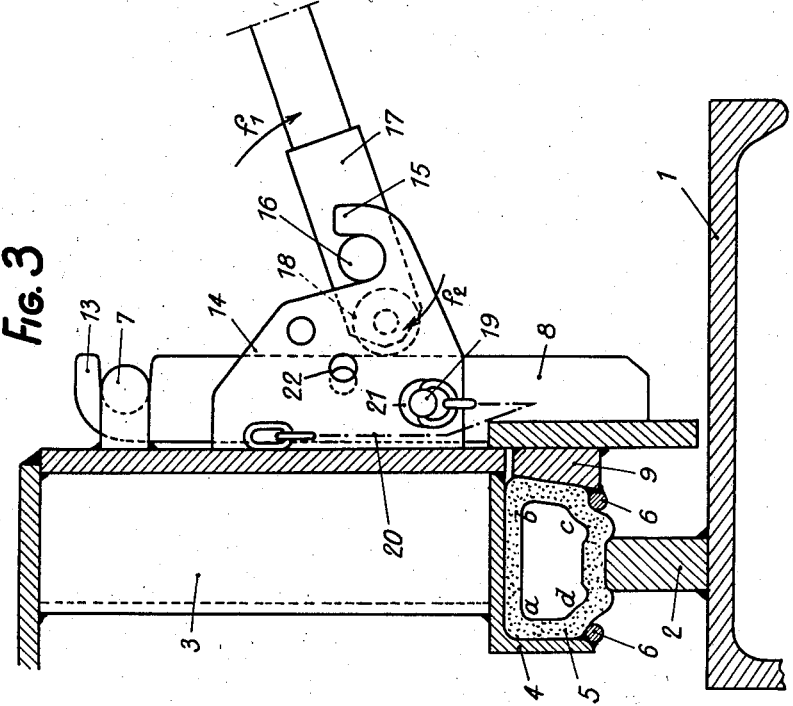

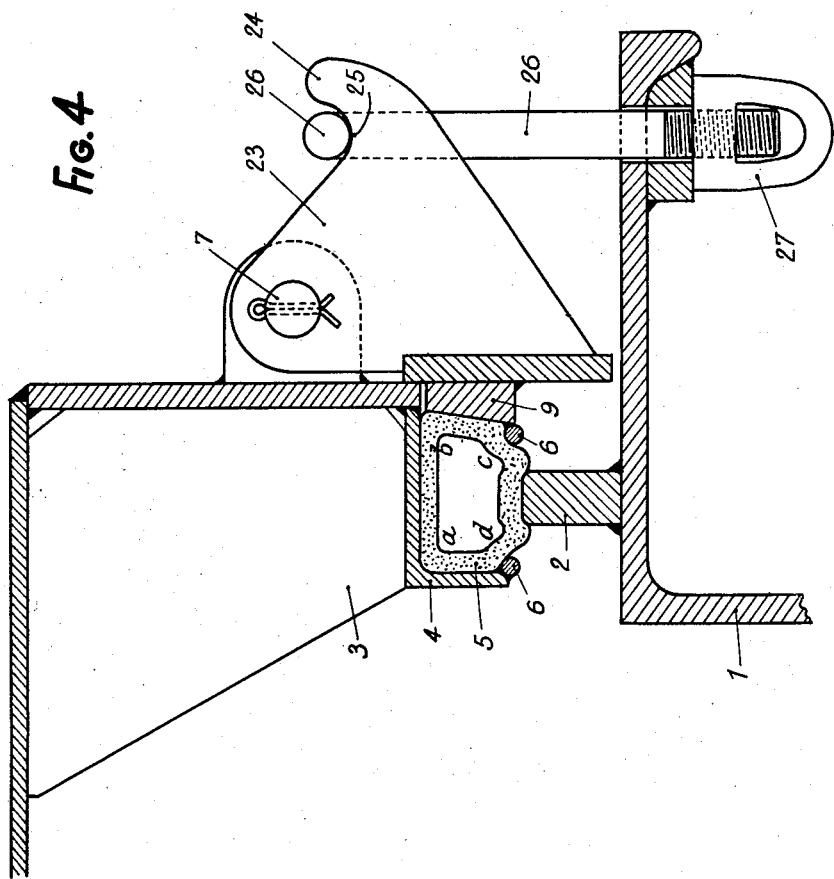

United States Patent Office 2,844,118
Patented July 22, 1958

2,844,118

WATER TIGHT HATCH COVER ARRANGEMENT

Henri Kummerman, Paris, France, assignor to International MacGregor Organization (I. M. G. O.), Casablanca, Morocco, a body corporate of Morocco Application December 5, 1955, Serial No. 551,163

Claims priority, application France December 20, 1954

11 Claims. (Cl. 114—202)

This invention relates to methods of and devices for forming a fluid-tight joint between fixed and movable members. More particularly, this invention aims at providing a fluid-tight joint between on the one hand members pertaining to stationary assemblies and on the other hand other members adapted to slide or roll with respect to the stationary members, the invention being concerned inter alia with the application of joints of this general type to hatch-covers of ship holds, doors, cover panels, closing panels of railway freight cars, etc.

The water-tight joints employed in these various applications comprise as a rule sealing gaskets of resiliently yielding material which are generally held in proper sealing position by the very weight of the movable members bearing on the edges of the fixed members. As the weight of these movable members may be excessive with respect to the mechanical resistance of the gasket material consisting generally of rubber or like products, the compression action exerted thereon is held within reasonable limits by providing rigid elements on both fixed and movable members which are brought into mutual bearing engagement to limit the compression. More particularly, in the specific case of hatch-covers for ship holds, rollers or wheels are employed to permit the movements of the hatch-covers along the edges of the hatch-coaming to the desired position, whereafter the hatch-covers are lowered by seating them on seats provided for this purpose along the coaming. This hatch-cover lowering is attended by a certain compression of the gasket material and obtained as a rule by rotating eccentric wheel hubs or rollers formed with a flat peripheral portion, or by engaging the rollers or wheels in suitable slots formed in the coaming plate.

The essential and most advantageous feature of the method and device according to this invention is that a perfectly fluid-tight joint is obtained without using any of the auxiliary devices mentioned hereinabove.

The method of this invention is remarkable notably in that it consists in fitting water-tight sealing gaskets or linings either on each of the movable members, or on the fixed members, or both, at suitable locations unlikely to interfere with the free movements of the movable members, bringing said movable members to the desired point along their path, and deforming the gaskets by a pressure exerted thereon from the outside only, so as to cause these gaskets to engage their relevant seats and form a fluid-tight joint between said fixed and movable members, independently of the weight of the movable assembly.

According to another feature of this invention, the aforesaid gaskets or linings are fitted in such positions of the said fixed and/or movable members that during the movements of the movable panels or hatch-covers they lie permanently in close vicinity of their relevant seats but without engaging same, so as to form a water-tight joint.

From the foregoing it will be readily apparent that with the method of this invention it will be sufficient to bring the hatch-covers of ship holds to the desired location along the hatch-way-coaming, for example by rolling, and instead of lowering these hatch-covers on their seats, according to the former method, to alter the cross-sectional shape of the sealing gaskets or linings fitted for example along the lower edge of the movable hatch-covers so as to cause these gaskets or linings to engage the cooperating elements provided for this purpose along the underlying fixed elements of the hatchway coaming. It is only necessary to provide a simple device adapted to keep this deforming pressure exerted against the gaskets or linings, this pressure remaining automatically within reasonable limits consistent with the mechanical resistance of the gasket or lining material.

This invention is also concerned with a device for carrying out the method broadly described hereinabove, this device being remarkable notably in that the sealing gaskets or linings are fitted either on each of the movable members, or on the fixed member, or on both members at locations wherein these gaskets or linings are free and do not interfere with the movements of the movable members, means being also provided for exerting on these gaskets or linings a pressure adapted to alter their shape and cause them to engage the registering seats so as to form a fluid-tight joint between the fixed and movable members.

According to another feature of this invention, the aforesaid means acting as compression members adapted to alter the shape of the gaskets or linings for the purpose set forth hereinabove consist of oscillating, rocking, sliding or like members mounted either on the movable members or on the fixed members, or on both.

Other advantages and features of the invention will appear as the following description proceeds with reference to the attached drawings forming part of this specification and showing by way of example a few embodiments of the invention. In the drawings:

Figure 1 is a cross-sectional fragmentary view showing a first form of embodiment of a device made in accordance with the teachings of this invention, concerning more particularly the closing of hatch-covers on ship hold coamings;

Figure 2 is a view similar to Figure 1 showing the same assembly but in the rolling position of the hatch-cover;

Figures 3 and 4 are views similar to Figure 1 showing two alternate embodiments.

In the embodiment illustrated in Figures 1 and 2 the reference numeral 1 designates a fixed member forming a support such as a ship coaming edge. This edge has secured thereon by welding or otherwise a projecting member 2. Movable members 3, for example hatch-covers adapted to roll along the hatchway coaming, are provided for closing the hatchway coaming by engaging the projecting member 2. The lower portions of the hatch-covers 3 have secured thereon, preferably by welding or through any other suitable method, angle bars or like section members 4 forming a longitudinal cavity or groove adapted to receive and retain a sealing gasket or lining 5 of resiliently yielding material such as rubber or any other adequate material. In the example illustrated this gasket is assumed to be of tubular hollow cross-section, but it will be readily understood that any other types of linings may be employed without departing from the spirit and scope of the invention. The gasket is held in position by means of beads or the like 6, or any other suitable means.

On the outer lateral face of the hatch-cover 3 there is provided a pivot pin 7 having its axis parallel to the longitudinal direction of the cover and carrying a plate-like depending member 8 having an inner projection 9 welded or otherwise secured on its lower portion; this projection 9 is adapted to engage the side face of the sealing gasket 5. To this end an angle bar or like section 4 is used preferably so as to leave a free face, for example the face b—c of the gasket, whereby the latter may be engaged freely by the projection 9, as shown. Similarly, the lower face d—c of the gasket is also left free in view of its engagement with the projecting member 2.

The member 8 may be locked in the joint-sealing position by any suitable means, for example a clevis 10 anchored behind the side wall 11 of the hatch-cover 3 and formed with a screw-threaded bolt member 10 carrying a nut 12.

The operation of the device described hereinabove is very simple. In fact, when the hatch-covers roll along the hatchway coaming, they bear on rollers or wheels which are well known to anybody conversant with the art and are therefore not shown in the drawings. Under these conditions, the hatch-cover and the pivoted lever 8 associated therewith are positioned as shown in Figure 2, with the gasket or lining 5 slackened and having its lower face d—c definitely spaced above the projecting member 2 secured on the coaming. The member 9 carried by the plate 8 engages the side face b—c of the gasket, however without altering its natural shape.

From the foregoing it will be readily understood that the hatch-cover may roll freely and can be easily brought to the desired position. These conditions are illustrated in Figure 1. When the hatch-cover has reached the desired position, e. g. its hatchway closing position, the depending member 8 is pivoted about its pin 7 in order to exert a pressure through the projection 9 on the resilient yielding gasket 5 in the direction of the arrow $f$. As a result of the pressure thus produced on the free face b—c a deformation having substantially the cross-sectional shape shown in Figure 1 is obtained so as to cause the lower face d—c of the gasket to engage the upper face of the projecting member 2. Upon completion of this operation, the pressure exerted by the projection 9 on the gasket 5 is maintained by simply tightening the nut 12 as required.

It is evident that the joint thus obtained may be as tight as desired and makes it possible to dispense with all the complicated, heavy and cumbersome means hitherto used for the same purpose, i. e. wheels or rollers with eccentric hubs, wheels or rollers with a flat peripheral portion, grooves or slots in the hatch-coaming runways, etc.

The modified embodiment illustrated in Figure 3 differs from the embodiment of Figures 1 and 2 in that the oscillating member 8 is simply suspended at 13 from its pivot pin 7 and movable between a pair of flanges 14 provided with end hooks 15 adapted to be engaged by a transverse pin 16 rigid with an operating lever 17 carrying at its lower end a roller 18 engaging the outer surface of the plate member 8 and acting as a cam. A plurality of holes are properly located in the flanges 14 and member 8 for receiving a lock pin 19 secured through a chain or like means 20 on the hatch-cover 3. Two holes may be provided in the flanges and in the plate member 8. In fact, the purpose of the orifices 21 is to hold the plate 8 away from the side of the hatch-cover during the movements thereof along the hatchway coaming, and the orifices 22 are provided for locking the plate 8 in its gasket-engaging position after the operator has lowered the lever 17 in the direction of the arrow $f_1$ so as to cause the roller 18 to move up the plate 8 in the direction of the arrow $f_2$, thereby exerting the desired pressure against the compression plate assembly 8, 9.

The modified embodiment of Figure 4 differs from the embodiment of Figures 1 and 2 in that the compression plate 8 is given a special shape. In this embodiment the member 8 constitutes a gusset 23 comprising a horn-like projection 24 and a notch 25 adapted to be engaged by a curved bolt 26. The opposite end of the bolt 26 is held in position by a nut 27, as shown. It will be readily apparent that with this arrangement the compression member 9 may be clamped and locked in position simultaneously by screwing in the nut 27 so that the latter will draw the horn 24 downwards to pivot the gusset 23 about its fulcrum and anchor pin 7.

Although the foregoing describes more particularly the special shape given to the angle bar or section 4 carrying the gasket or lining 5 wherein it is assumed that the latter is compressed on one face only, it will be readily understood that the gasket or lining may be deformed by compressing it on two faces simultaneously; besides, the gasket may engage the seat 2 with two faces instead of one.

Of course, the invention is not limited to the specific forms of embodiment shown and described herein, as many modifications and alterations may be brought thereto without departing from the spirit and scope of the invention, as per the appended claims.

What I claim is:

1. A hatch cover arrangement comprising a hatch opening, guideways on the lateral sides of said hatch opening, at least one hatch cover section for closing said opening provided with means cooperating with said guideways for causing said section to ride over said opening to close and open same, a water tight joint arrangement between said section and guideways comprising a continuously and longitudinally extending channel means pertaining to at least one of said sections and guideways, said channel means having two solid adjacent sides, yieldingly deformable sealing means located in said channel means and between said solid sides thereof, a protruding continuously and longitudinally extending part on at least one of said sections and guideways registering with said sealing means but at a certain distance therefrom, forming thereby a clearance therebetween, outer independent longitudinally extending movable pressure means in parallel relationship with said protruding and sealing means facing one of the sides of said channel means which are not solid, said pressure means being shaped to compress and deform said sealing means to cause them to expand through another not solid side of said channel means, to fill said clearance and to closely fit against said protruding part forming thereby a watertight joint.

2. Arrangement according to claim 1 wherein said channel means have one of the open sides registering with said protruding part.

3. Arrangement according to claim 1 wherein said channel means are secured to the lower part of said hatch cover section, whereas the registering protruding part is fixedly mounted on said guideways.

4. Arrangement according to claim 2 wherein retaining means for said sealing means are provided in said channel means.

5. Arrangement according to claim 1 wherein one of said solid sides is horizontal and the other vertical.

6. Arrangement according to claim 1 wherein said pressure means consist of a pivotally mounted arm, of a protruding element registering with one of the open sides of said channel and of means for securing said arm and applying pressure upon said sealing means.

7. Arrangement according to claim 6 wherein said arm is mounted on said section.

8. Arrangement according to claim 6 wherein said arm is mounted on said guideways.

9. Arrangement according to claim 6 wherein said securing and pressure applying means consist of a cam like member and of a pin element for holding said cam against movement.

10. Arrangement according to claim 9 wherein two fixed lateral flanges are provided for mounting said cam like member which is detachable, securing pins and holes in said arm and flanges and lever means connected with said cam for applying pressure on said arm.

11. Arrangement according to claim 6 wherein said arm is provided with upstanding pivotally mounted gusset members, and with clamping bolts acting on said gussets at a place distant from the pivotal mounting of said gussets, said bolts ensuring the compression of the said sealing means and the securing of the said arm.

References Cited in the file of this patent

UNITED STATES PATENTS

| | | |
|---|---|---|
| 2,093,362 | Nelson | Sept. 14, 1937 |
| 2,279,005 | McMahan | Apr. 7, 1942 |
| 2,488,796 | Baier | Nov. 22, 1949 |